United States Patent
Min

(10) Patent No.: US 9,342,365 B2
(45) Date of Patent: May 17, 2016

(54) MULTI-CORE SYSTEM FOR BALANCING TASKS BY SIMULTANEOUSLY COMPARING AT LEAST THREE CORE LOADS IN PARALLEL

(71) Applicant: SAMSUNG ELECTRONICS CO., LTD., Suwon-si, Gyeonggi-do (KR)

(72) Inventor: Jung-Hi Min, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 278 days.

(21) Appl. No.: 13/709,608

(22) Filed: Dec. 10, 2012

(65) Prior Publication Data

US 2013/0247068 A1 Sep. 19, 2013

(30) Foreign Application Priority Data

Mar. 15, 2012 (KR) .......................... 10-2012-0026757

(51) Int. Cl.
*G06F 9/45* (2006.01)
*G06F 9/50* (2006.01)

(52) U.S. Cl.
CPC .............. *G06F 9/505* (2013.01); *G06F 9/5088* (2013.01); *Y02B 60/162* (2013.01)

(58) Field of Classification Search
CPC ...... G06F 9/505; G06F 9/5088; G06F 9/5083
USPC .................................................. 718/105, 100
See application file for complete search history.

(56) References Cited

U.S. PATENT DOCUMENTS

| | | | | |
|---|---|---|---|---|
| 5,860,137 A | * | 1/1999 | Raz et al. | 711/202 |
| 6,993,762 B1 | * | 1/2006 | Pierre | 718/102 |
| 7,590,149 B1 | * | 9/2009 | Bharali et al. | 370/468 |
| 7,793,293 B2 | * | 9/2010 | Norton | G06F 9/4881 718/102 |
| 8,621,480 B2 | * | 12/2013 | Gootherts | 718/105 |
| 2004/0024874 A1 | * | 2/2004 | Smith | G06F 9/5088 709/225 |
| 2005/0041031 A1 | * | 2/2005 | Diard | G06T 15/005 345/505 |
| 2005/0063301 A1 | | 3/2005 | Glaise et al. | |
| 2006/0123423 A1 | * | 6/2006 | Brenner | 718/105 |
| 2008/0065867 A1 | | 3/2008 | Ohwada | |
| 2008/0109814 A1 | | 5/2008 | Park | |
| 2009/0019449 A1 | * | 1/2009 | Choi et al. | 718/105 |
| 2009/0165014 A1 | * | 6/2009 | Park | 718/105 |
| 2011/0041131 A1 | * | 2/2011 | Srivatsa et al. | 718/102 |
| 2011/0107344 A1 | | 5/2011 | Kim et al. | |
| 2014/0101670 A1 | * | 4/2014 | Bae | G06F 9/46 718/105 |
| 2014/0137135 A1 | * | 5/2014 | Lee | G06F 9/505 718/105 |

FOREIGN PATENT DOCUMENTS

| | | |
|---|---|---|
| JP | 2003-323414 | 11/2003 |
| JP | 2007-188212 | 7/2007 |
| JP | 2008-191949 | 8/2008 |
| JP | 2011-141782 | 7/2011 |
| KR | 100901286 | 6/2009 |
| KR | 1020100074920 | 7/2010 |

* cited by examiner

*Primary Examiner* — Meng An
*Assistant Examiner* — Willy W Huaracha
(74) *Attorney, Agent, or Firm* — F. Chau & Associates, LLC

(57) ABSTRACT

A multi-core system includes at least three cores, a load comparator and a load migrator. The comparator simultaneously compares at least three loads of the at least three cores to detect a maximum load and a minimum load. The load migrator determines a first core having the maximum load as a source core and a second core having the minimum load as a target core of the at least three cores to migrate tasks from the source core to the target core.

12 Claims, 5 Drawing Sheets

MULTI-CORE SYSTEM FOR BALANCING TASKS BY SIMULTANEOUSLY COMPARING AT LEAST THREE CORE LOADS IN PARALLEL

CROSS-REFERENCE TO RELATED APPLICATION(S)

This application claims priority under 35 USC §119 to Korean Patent Application No. 2012-0026757, filed on Mar. 15, 2012, in the Korean Intellectual Property Office (KIPO), the disclosure of which is incorporated by reference in its entirety herein.

BACKGROUND

1. Technical Field

Exemplary embodiments of the inventive concept relate to multi-core systems, and more particularly to load balancing methods and multi-core systems for migrating tasks from one core to another core.

2. Discussion of Related Art

In a multi-core system, one chip may include several cores. Thus a plurality of tasks can be simultaneously performed. However, performance of the system cannot be proportionally improved by increasing the number of cores due to load imbalance, where tasks are not equally distributed among all cores. For example, some cores may be assigned more tasks than others. Accordingly, load balancing is required.

However, as the number of cores increases in the multi-core system, it becomes more difficult to perform load balancing. Further, when a load imbalance is present, the system may use more than an optimum amount of power and operate at less than an optimum level of efficiency.

SUMMARY

At least one exemplary embodiment of the inventive concept provides a method of balancing loads in a multi-core system, which is capable of reducing time and power consumption in load balancing.

At least one exemplary embodiment of the inventive concept provides a multi-core system which is capable of reducing time and power consumption in load balancing.

In a method of balancing a multi-core system including at least three cores according to an exemplary embodiment of the inventive concept, at least three loads of the at least three cores are simultaneously compared to detect a maximum load and a minimum load. A first core having the maximum load and a second core having the minimum load are respectively determined as a source core and a target core of the at least three cores. Tasks are migrated from the source core to the target core.

The at least three loads of the at least three cores may be simultaneously compared by comparing at least three load weights of at least three run queues in parallel, each included in each of the at least three cores.

The tasks may be migrated by migrating the tasks from a first run queue corresponding to the source core to a second run queue to the target core.

The at least three load weights may be generated based on schedule classes and priorities of the at least three loads.

The at least three loads of the at least three cores may be simultaneously compared by comparing at least three updating numbers per unit time of at least three program counters in parallel, each corresponding to each of the at least three cores.

Each of the at least three updating numbers per unit time may increase more and more as each of at least three cores is more and more busy.

The at least three loads of the at least three cores may be simultaneously compared by comparing at least three requesting numbers per unit time to at least three caches in parallel, each corresponding to each of the at least three cores.

Each of the at least three requesting numbers per unit time may increase more and more as each of the at least three cores is more and more busy.

A multi-core system according to an exemplary embodiment of the inventive concept includes at least three cores, a load comparator and a load migrator. The comparator simultaneously compares at least three loads of the at least three cores to detect a maximum load and a minimum load. The load migrator determines a first core having the maximum load as a source core and a second core having the minimum load as a target core of the at least three cores to migrate tasks from the source core to the target core.

The load comparator may include a maximum load detector that compares simultaneously at least three load weights of at least three run queues to detect the maximum load and a minimum load detector that compares simultaneously the at least three load weights of the at least three run queues to detect the minimum load. Each of the at least three run queues may correspond to each of the at least three cores.

The at least three load weights may be generated based on schedule classes and priorities of the at least three loads.

The load comparator may include a maximum load detector that compares simultaneously at least three updating numbers per unit time of at least three program counters to detect the maximum load and a minimum load detector that compares simultaneously the at least three updating numbers per unit time of the at least three program counters to detect the minimum load. Each of the at least three program counters may correspond to each of the at least three cores.

The load comparator may include a maximum load detector that compares simultaneously at least three requesting numbers per unit time of at least three caches to detect the maximum load and a minimum load detector that compares simultaneously the at least three requesting numbers per unit time of the at least three caches to detect the minimum load. Each of the at least three caches may correspond to each of the at least three cores.

According to an exemplary embodiment of the inventive concept, a multi-core system includes first through third cores, first through third counters, a load comparator, and a load migrator. Each counter receives a corresponding number from a corresponding one of the cores. The load comparator includes three first input channels to receive all the corresponding numbers in parallel to determine a maximum value and three second input channels to receive all the corresponding number in parallel to determine a minimum value. The load migrator is configured to designate one of the cores having the maximum value as a source core and a second one of the cores having the minimum value as a target core to migrate a task from the source core to the target core.

The load comparator may include a first comparator including the three first input channels and a second comparator including the three second input channels. The load comparator may include a pair of output channels configured to output the minimum and maximum values in parallel to the load migrator. The load migrator may include a pair of input channels to receive the minimum and maximum values in parallel from the load comparator. Each core may include a program counter, where the numbers correspond to a value of each of the program counters. Each core may include a cache, where the numbers alternately correspond to a number of requests to each of the caches. The system may further include one nm queue for each core, where the load migrator migrates the task from the run queue of the source core to the run queue of the target core. The numbers may be sampled by the system periodically each given period of time. The counters may be reset after the sampled numbers are output to the load comparator.

BRIEF DESCRIPTION OF THE DRAWINGS

Exemplary embodiments of the inventive concept will be more clearly understood from the following detailed description taken in conjunction with the accompanying drawings.

DETAILED DESCRIPTION

Figure 1:
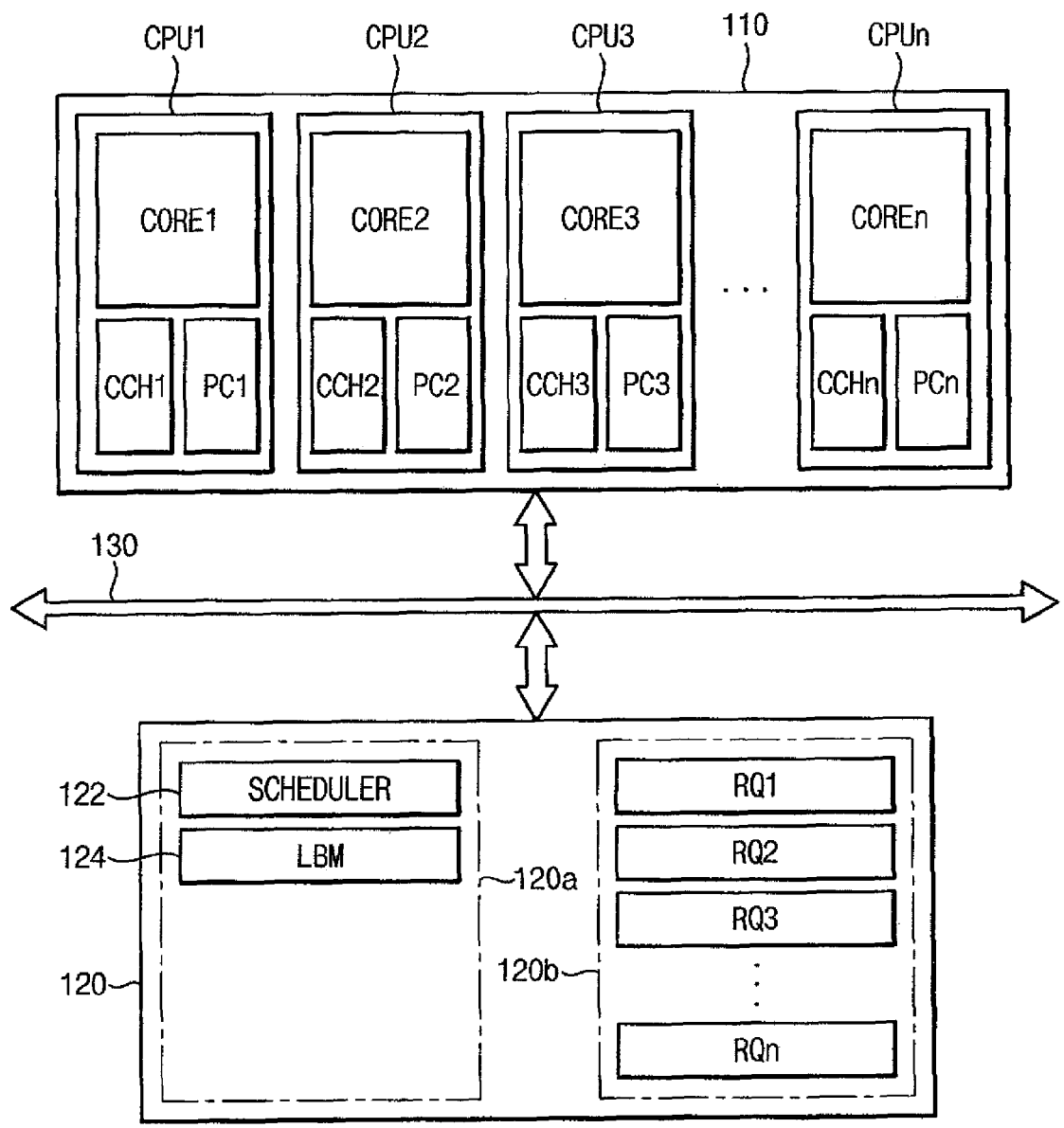
FIG. 1 is a block diagram illustrating a multi-core system according to an exemplary embodiment of the inventive concept.

The inventive concept will be described more fully hereinafter with reference to the accompanying drawings, in which exemplary embodiments of the inventive concept are shown. The present inventive concept may, however, be embodied in many different forms and should not be construed as limited to the exemplary embodiments set forth herein. In the drawings, the sizes and relative sizes of layers and regions may be exaggerated for clarity. Like numerals refer to like elements throughout.

It will be understood that when an element is referred to as being "connected" or "coupled" to another element, it can be directly connected or coupled to the other element or intervening elements may be present. As used herein, the singular forms "a," "an" and "the" are intended to include the plural forms as well, unless the context clearly indicates otherwise. Further, use of simultaneous herein with respect to actions may mean that these actions are performed in parallel, at the same time, at substantially the same, etc FIG. 1 is a block diagram illustrating a multi-core system according to an exemplary embodiment of the inventive concept.

Referring to FIG. 1, a multi-core system 100 includes a multi-core processor 110, a memory 120 and a bus 130. The memory 120 includes a first storage area 120a including a scheduler 122 and a load balancing manager (LBM) 124 and a second storage area 120b including a plurality of run queues RQ1, RQ2, RQ3, ..., RQn (where n is a natural number equal to or greater than three). Each of the run queues RQ1-RQn may correspond to each of cores CORE1, CORE2, CORE3, ..., COREn. For example, one of the run queues may be assigned to each of the cores. The multi-core system 100 may have additional components such as one or more input/output devices. In an exemplary embodiment, the multi-core system 100 is implemented with software or a combination of hardware and software.

The multi-core processor 110 includes a plurality of CPUs CPU1, CPU2, CPU3, ..., CPUn that execute tasks stored in the memory 120. For example, the multi-core processor 110 may include at least three cores such as a quad-core processor having four cores, a hexa-core processor having six cores, etc. The multi-core processor 110 may include different cores such as central processing unit (CPU), a graphic processing unit (GPU), a data signal processor (DSP), etc.

Each of the CPUs CPU1-CPUn may include each of cores CORE1-COREn, each of registers PC1, PC2, PC3, PCn and each of caches CCH1, CCH2, CCH3, ..., and CCHn. Each of the cores CORE1-COREn is an actual processor of each of the CPUs CPU1-CPUn and is responsible for reading and executing instructions. Each of the registers PC1-PCn corresponds to a program counter. Each program counter has an address value of a next instruction to be executed. The busier the cores CORE-COREn become, the more rapidly updating numbers per unit time associated with the program counters PC1-PCn increase. As an example, an updating number associated with a program counter of a core could increase from being incremented 100 times a second to being incremented 1000 times a second when the core becomes busier. In at least one embodiment of the inventive concept, each of the caches CCH1-CCHn is a level-one (L1) cache, which is an internal cache included in each of the CPUs CPU1-CPUn. The busier the cores CORE1-COREn become, the more rapidly requesting numbers per unit time associated with the caches CCH1-CCHn increase. As an example, the number of cache requests to a cache of a core could increase from 100 requests per second to 1000 requests per second when the core becomes busier.

The memory 120 is an operating space for the CPUs CPU1-CPUn to process the tasks, and may be loaded with various programs and tasks of an operating system in the first storage area 120a. The memory 120 also includes the second storage area 120b that includes the run queues RQ1-RQn, in which tasks to be performed by the CPUs CPU1-CPUn are stored correspondingly to each CPU. For example, the run queues may indicate which task is to be performed next and by which CPU.

The active processes may be stored in the run queues when a plurality of processes need to be simultaneously performed in a system. In an exemplary embodiment of the inventive concept, each run queue has a priority of each of the processes and a scheduler determines a next process to be performed based on the priority of each of the processes.

The scheduler 122 schedules various tasks of the multi-core system 100 and may supply the scheduled tasks with resources required by the corresponding tasks. The scheduler may be a CPU scheduler, which assigns tasks stored in the run queues RQ1-RQn of the memory 120 to a corresponding CPU according to a predetermined scheduling policy, or a task scheduler, which loads required programs in the memory 120 from a storage device, such as a disc device.

The load balancing manager 124 simultaneously compares load weights LW1~LWn of the run queues RQ1~RQn in parallel to migrate tasks from one run queue having a maximum load to another run queue having a minimum load and provides load balancing management information to the scheduler 122. The load balancing manager 124 may be part of a computer program that houses the scheduler 124 and accordingly the load balancing manager 124 may have a software architecture.

The scheduler 122 migrates tasks from one run queue of one CPU to another run queue of another CPU through the load balancing manager 124 when load misbalancing occurs in the multi-core system 100. The scheduler 122 may assign tasks stored in the run queues RQ1-RQn to the CPUs CPU1-CPUn according to a predetermined scheduling policy. For example, various scheduling methods may be used such as a scheduling policy according to priority.

The scheduler 122 may assign tasks to a CPU and migrate a task in an operating system from one CPU to another. Accordingly, one or more operations described herein may be performed by the scheduler 122.

Figure 2:
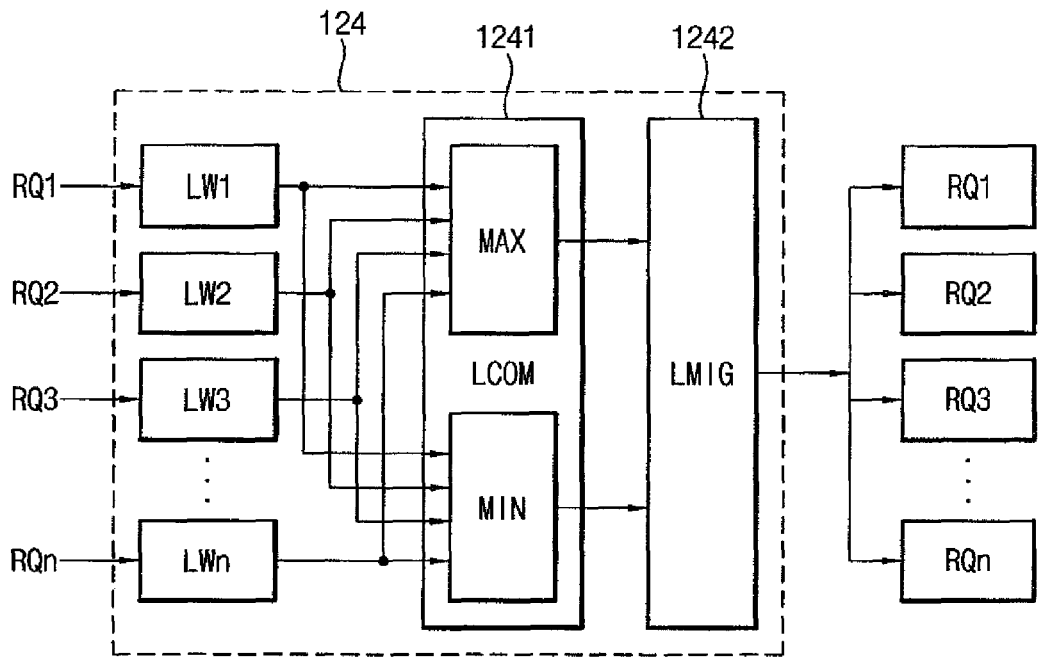
FIG. 2 is a block diagram illustrating a load balancing manager in FIG. 1 according to an exemplary embodiment of the inventive concept.

FIG. 2 is a block diagram illustrating a load balancing manager according to an exemplary embodiment of the inventive concept.

Referring to FIG. 2, the load balancing manager 124 includes a load comparator 1241 and a load migrator 1242. The load comparator 1241 includes a maximum load detector MAX and a minimum load detector MIN for simultaneously comparing the loads of the cores CORE1-COREn and detecting a maximum load and a minimum load. The maximum load detector MAX simultaneously compares the load weights LW1, LW2, LW3, . . . , LWn of the run queues RQ1-RQn of the cores CORE1-COREn in parallel to detect a first core having the maximum load. The minimum load detector MIN simultaneously compares the load weights LW1-LWn of the run queues RQ1-RQn of the cores CORE1-COREn in parallel to detect a second core having the minimum load. For example, the load comparator 1241 may include $2n$ channels, where n correspond to the number of cores or run queues. For example, if there are 4 cores, the load comparator 1241 may include 8 channels, where 4 channels provide the load weights of the 4 cores in parallel to the maximum load detector MAX, and the other 4 channels provide the load weights of the 4 cores in parallel to the minimum load detector MIN. In an exemplary embodiment of the inventive concept, each of the load weights LW1-LWn is a value generated by applying schedule classes and priorities of the loads to a total load of the multi-core system 100.

The load migrator 1242 determines the first core having the maximum load as a source core and the second core having the minimum load as a target core to migrate tasks from a first run queue corresponding to the source core to a second run queue corresponding to the target core. The load migrator 1242 may include a pair of input channels so that minimum and maximum values output by the load comparator 1241 may be received in parallel.

Figure 3:
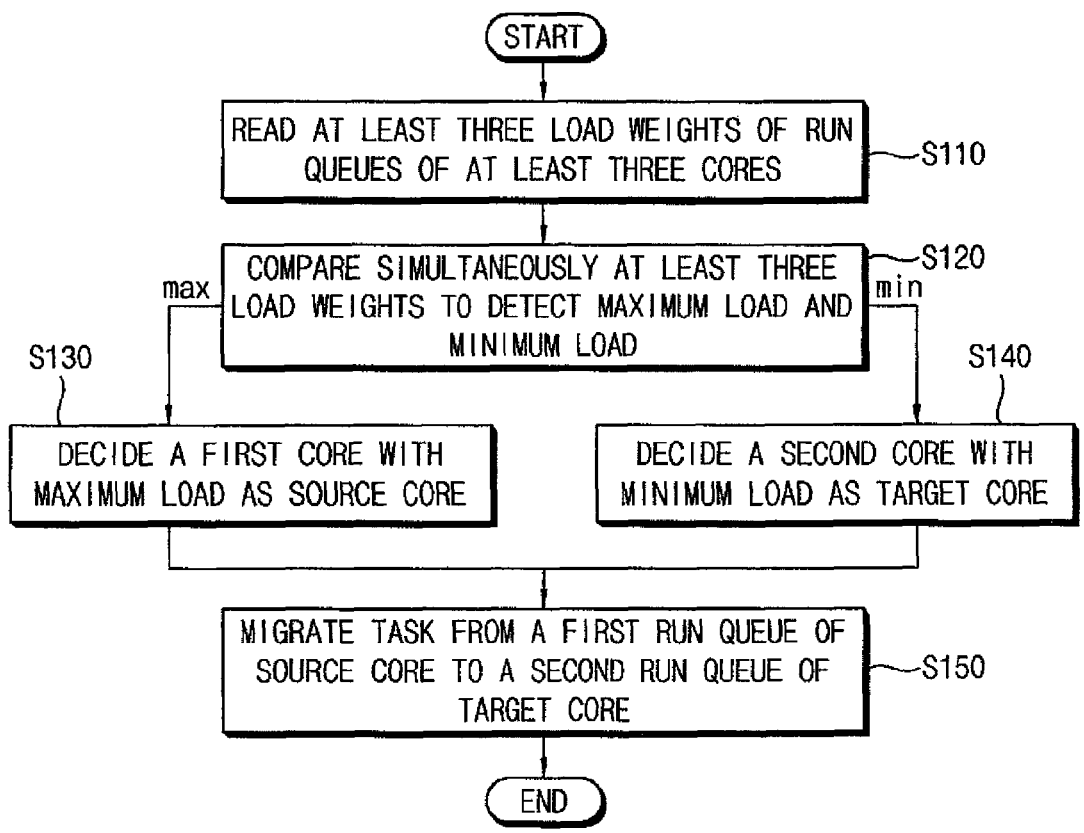
FIG. 3 is a flow chart illustrating a method of balancing a load in a multi-core system including at least three cores according to an exemplary embodiment of the inventive concept.

FIG. 3 is a flow chart illustrating a method of balancing load in a multi-core system including at least three cores according to an exemplary embodiment of the inventive concept.

Hereinafter, a method of balancing a load in a multi-core system including at least three cores according to an exemplary embodiment of the inventive concept will be described with reference to FIGS. 1 through 3.

Referring to FIGS. 1 through 3, load weights LW1-LWn are read from the run queues RQ1-RQn corresponding to each of the cores CORE1-COREn (S110). In an exemplary embodiment of the inventive concept, each of the load weights LW1-LWn is a value generated by applying schedule classes and priorities of the loads to a total load of the multi-core system 100. The load weights LW1-LWn are provided to the maximum load detector MAX and the minimum load detector MIN and are simultaneously compared (S120). Thus, the first core having the maximum load and the second core having the minimum load may be determined within one comparison operation. For example, if a processor of the system executes one instruction every pre-determined period of time, the one comparison operation would be completed within the one pre-determined period of time. The load migrator 1242 determines or designates the first core having the maximum load as a source core (S130) and the second core having the minimum load as a target core (S140). The load migrator 1242 migrates one or more tasks from a first run queue corresponding to the source core to a second run queue corresponding to the target core (S150).

Therefore, load balancing of the multi-core system may be performed because some processes of the first run queue corresponding to the source core having the maximum load have been migrated to the second run queue corresponding to the target core having the minimum load.

Figure 4:
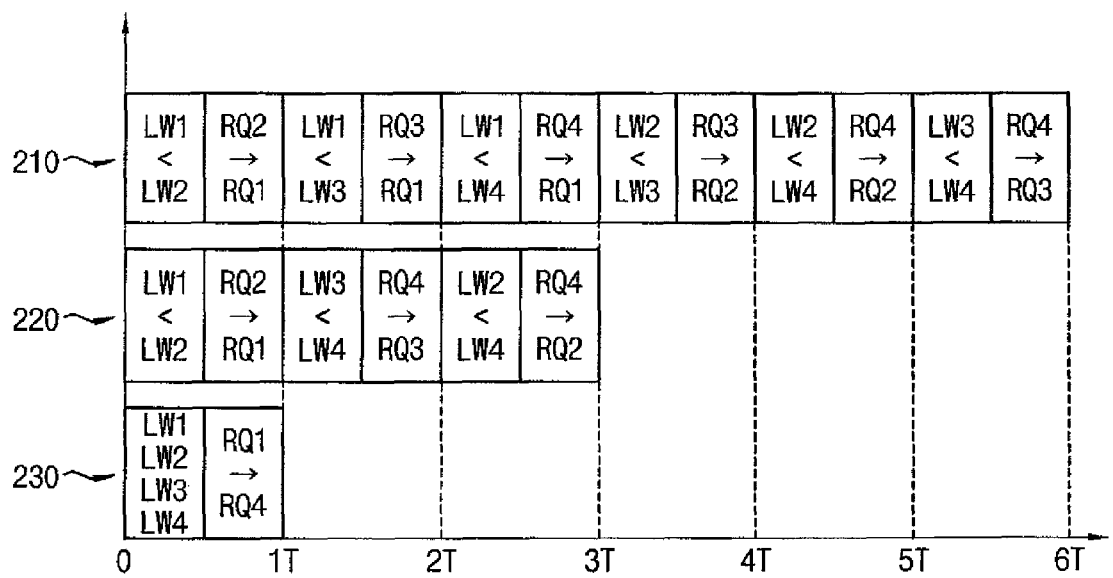
FIG. 4 illustrates times required for load balancing in at least one exemplary embodiment of the inventive concept.

FIG. 4 illustrates exemplary times required for load balancing in at least one exemplary embodiment of the inventive concept.

Referring to FIG. 4, in a first load balancing scheme in which the cores are paired and combinational paired cores are compared as represented by a reference numeral 210, the total number of load weight comparisons is six including (LW1<LW2), (LW1<LW3), (LW1<LW4), (LW2<LW3), (LW2<LW4) and (LW3<LW4) and the total number of task migrations is six including (RQ2-->RQ1), (RQ3-->RQ1), (RQ4-->RQ1), (RQ3-->RQ2), (RQ4-->RQ2) and (RQ4-->RQ3). A time required for performing one load weight comparison and one task migration is represented by T. Accordingly, this first load balancing scheme requires a time of 6T. In a second load balancing scheme in which the cores are compared in a tournament way as represented by a reference numeral 220, the total number of load weight comparisons of the cores is three including (LW1<LW2), (LW3<LW4) and (LW2<LW4) and the total number of task migrations is three including (RQ2-->RQ1), (RQ4-->RQ3) and (RQ4-->RQ2). Therefore, a time required for performing one load weight comparison and one task migration is respectively represented by T, and accordingly the total time required in the second load balancing scheme is 3T.

According to an exemplary embodiment of the inventive concept, all of the load weights LW1, LW2, LW3 and LW4 are simultaneously compared and one task migration including (RQ1-->RQ4) occurs. Therefore, the total time required in the load balancing scheme of the present embodiment is T.

Accordingly, in at least one exemplary embodiment of the inventive concept, the total time required in the load balancing is T and is independent of the numbers of the cores present. However, the total time required in the first and second load balancing schemes increases as the number of the cores increases.

Figure 5:
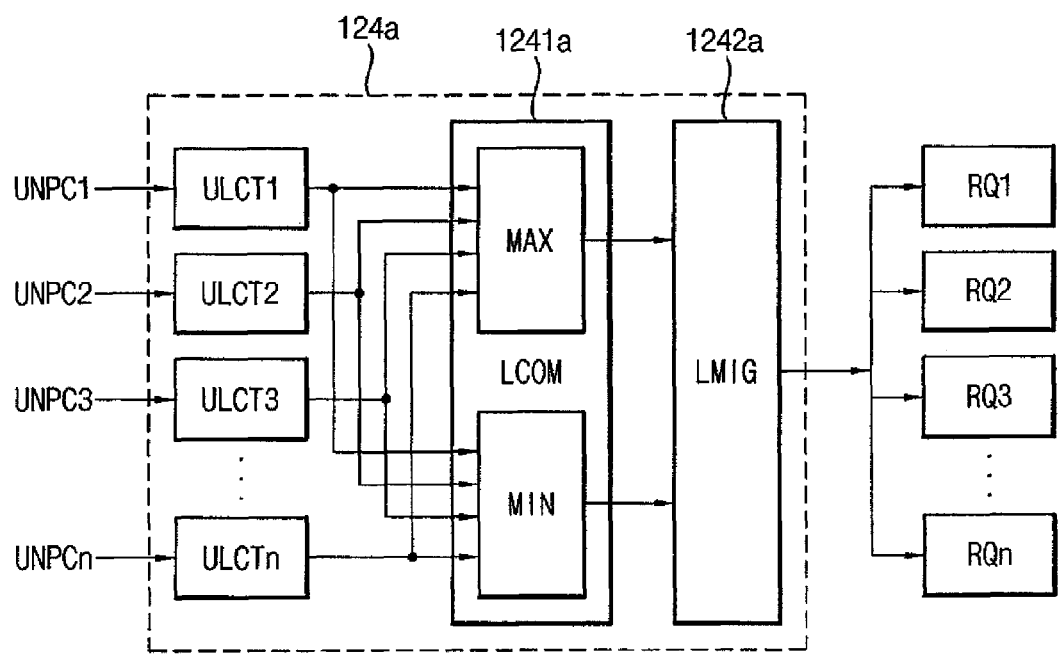
FIG. 5 is a block diagram illustrating a load balancing manager in FIG. 1 according to an exemplary embodiment of the inventive concept.

FIG. 5 is a block diagram illustrating the load balancing manager in FIG. 1 according to an exemplary embodiment of the inventive concept.

Referring to FIG. 5, a load balancing manager 124a includes updating counters ULCT1-ULCTn, a load comparator 1241a and a load migrator 1242a.

The load comparator 1241a may include first input channels for receiving outputs of each of the updating counters ULCT1-ULCTn in parallel and second input channels for receiving outputs of each of the updating counters ULCT1-ULCTn in parallel. Accordingly, the load comparator 1241a is able to perform two separate comparisons on all of the outputs at the same time. The load comparator 1241a may include a first comparator for receiving the data from the first input channels and performing a first comparison thereon and a second comparator for receiving the data from the second input channels and performing a second comparison thereon. For example, the first comparison may be used to determine a maximum value and the second comparison may be used to determine a minimum value. The load comparator 1241a may include a pair of output channels that respectively output the minimum and maximum values to the load migrator 1242a in parallel. The first comparator may include one of the output channels and the second comparator may include the other output channel. The first and second comparators may be controlled by a same clock signal to allow the comparisons to be performed at the same time or at substantially the same time.

The load comparator 1241a includes a maximum load detector MAX and a minimum load detector MIN. Each of the updating counters ULCT1-ULCTn counts (or samples) updating numbers UNPC1-UNPCn of each program per unit time for each of the program counters PC1-PCn PC1~PCn corresponding to each of the cores CORE1-COREn. The updating counters ULCT1-ULCTn can be reset to an initial value (e.g., 0) each unit time. For example, if the unit time is one second, and the first updating number UNPC1 is incremented from 5 to 8 within the last second, the first updating counter ULCT1 could be increased from 0 to 3. In this same example, if the first updating number UNPC1 is incremented from 8 to 12 in the next second, the first updating counter ULCT1 could be reset to 0 and then increased to 4.

The load comparator 1241a simultaneously compares outputs of the updating counters ULCT1-ULCTn to detect the first core having the maximum load and the second core having the minimum load. For example, if the outputs of the updating counters ULCT1-ULCT4 associated with the program counters PC1-PC4 of cores CORE1-CORE4 were respectively 4, 2, 8, and 7, the third core CORE3 would be considered as the first core with the maximum load and the second core CORE2 would be considered as the second core with the minimum load. The load migrator 1242a designates the first core having the maximum load as a source core and the second core having the minimum load as a target core to migrate tasks from a first run queue corresponding to the source core to a second run queue corresponding to the target core. Each of the program counters PC1-PCn has an address value of a next instruction to be executed. Therefore, the updating numbers of each of the program counters PC1-PCn increase more and more as a corresponding one of the cores CORE1-COREn is more and more busy. Therefore, the updating number of the corresponding program counter may be referred to as load information of a corresponding core.

Figure 6:
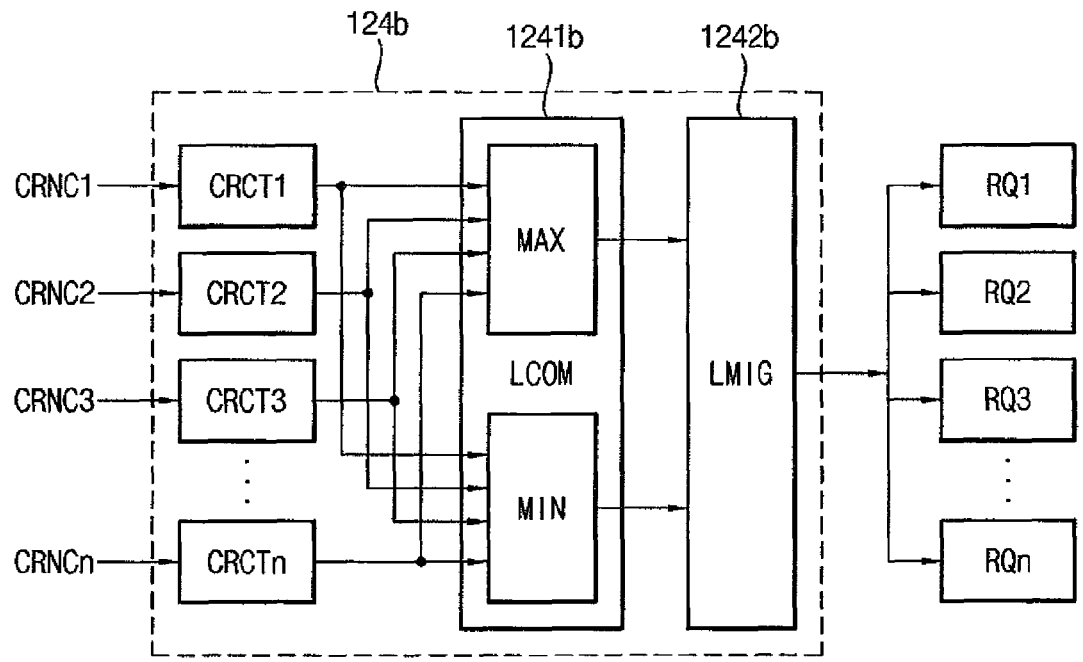
FIG. 6 is a block diagram illustrating a load balancing manager in FIG. 1 according to an exemplary embodiment of the inventive concept.

FIG. 6 is a block diagram illustrating the load balancing manager in FIG. 1 according to an exemplary embodiment of the inventive concept.

Referring to FIG. 6, a load balancing manager 124b includes cache request counters CRCT1-CRCTn, a load comparator 1241b and a load migrator 1242b. The load comparator 1241b includes a maximum load detector MAX and a minimum load detector MIN. Each of the cache request counters CRCT1-CRCTn counts cache-requesting numbers CRNC1-CRNCn per unit time for each cache of the cores CORE1-COREn. A cache-requesting number may correspond to a number of requests for data from a cache of a core. The cache request counters CRCT-CRCTn may be reset to an initial value (e.g., 0) each unit of time. For example, if the first cache CCH1 received 10 requests within the last second, the first cache request counter CRCT1 could be increased from a value of 0 to 10. In this same example, if the first cache CCH1 received 15 requests within the next second, the first cache request counter CRCT1 could be reset to 0 and then increased to 15. The load comparator 1241b simultaneously compares outputs of the cache request counters CRCT1~CRCTn to detect the first core having the maximum load and the second core having the minimum load. For example, if the number of cache requests for each of four caches CCH1-CCH4 over the last second was 20, 10, 15, and 5, respectively, the first core CORE1 would be considered the first core having the maximum load and the fourth core CCH4 would be considered the core having the minimum load. The load migrator 1242b designates or determines the first core having the maximum load as a source core and the second core having the minimum load as a target core to migrate tasks from a first run queue corresponding to the source core to a second run queue corresponding to the target core. The cache-requesting numbers CRNC1-CRNC1 per unit time of each of the cache request counters CRCT-CRCTn increase more and more as a corresponding one of the cores CORE1-COREn is more and more busy. The cache-requesting numbers of a cache (e.g., an L1 cache) may be referred to as load information of its corresponding core. A performance monitor unit (PMU) may be included in the load balancing manager 124b to query for the cache-requesting numbers of each core. For example, the PMU may be the one provided in an Advanced RISC Machine core.

Figure 7:
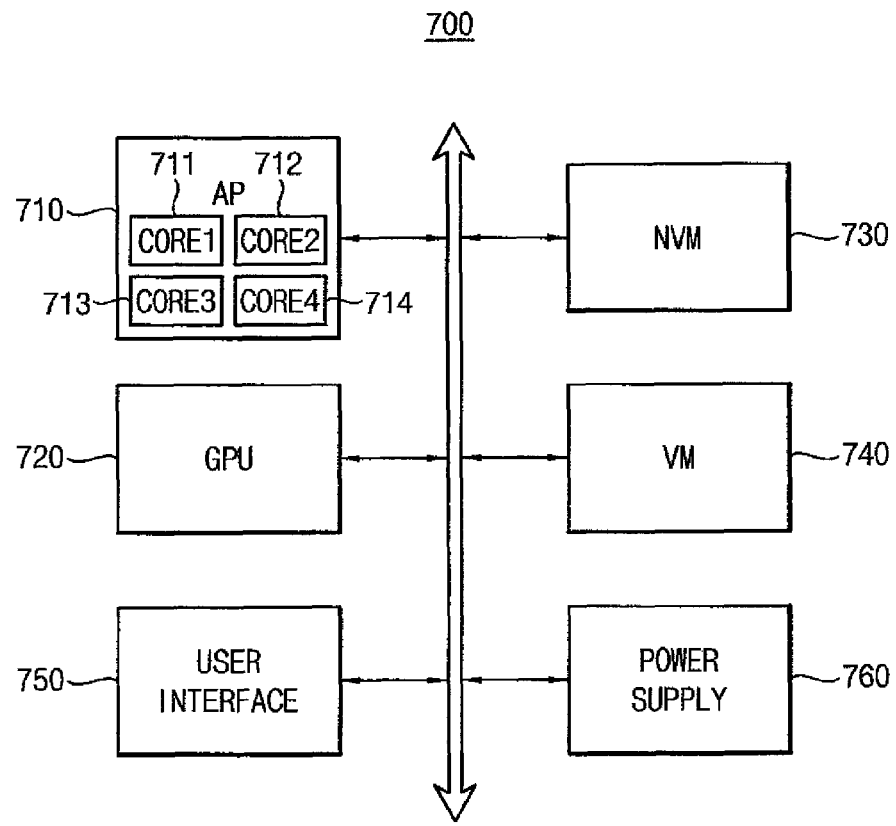
FIG. 7 is a block diagram illustrating a mobile system according to an exemplary embodiment of the inventive concept.

FIG. 7 is a block diagram illustrating a mobile system according to an exemplary embodiment of the inventive concept.

Referring to FIG. 7, a mobile system 700 includes an application processor 710, a graphic processing unit (GPU) 720, a nonvolatile memory device 730, a volatile memory device 740, a user interface 750 and a power supply 760. According to at least one exemplary embodiment of the inventive concept, the mobile system 700 may be any mobile system, such as a mobile phone, a smart phone, a personal digital assistant (PDA), a portable multimedia player (PMP), a digital camera, a portable game console, a music player, a camcorder, a video player, a navigation system, etc.

The application processor 710 may include processor cores 711, 712, 713, and 714. As an example, the processor cores 711-714 may execute applications, such as an internet browser, a game application, a video player application, etc. The applications may request input/output operations for hardware devices, such as the GPU 720, the nonvolatile memory device 730, the volatile memory device 740, the user interface 750, etc. The application processor 710 may perform load balancing by simultaneously comparing loads of the processor cores 711-714 to migrate a task from one processor core having a maximum load to another process core having a minimum load. Accordingly, the processor cores 711-714 may efficiently operate, and a performance of the mobile system 700 may be improved. In at least one exemplary embodiment of the inventive concept, the processor cores 711-714 are coupled to an internal or external cache memory.

The GPU 720 may process image data, and may provide the processed image data to a display device. For example, the GPU 720 may perform a floating point calculation, graphics rendering, etc. According to at least one exemplary embodiment of the inventive concept, the GPU 720 and the application processor 710 are implemented as one chip, or as separate chips.

The nonvolatile memory device 730 may store a boot code for booting the mobile system 700. For example, the nonvolatile memory device 730 may be implemented by an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. The volatile memory device 740 may store data processed by the application processor 710 or the GPU 720, or may operate as a working memory. For example, the non-volatile memory device 740 may be implemented by a dynamic random access memory (DRAM), a static random access memory (SRAM), a mobile DRAM, etc.

The user interface 750 may include at least one input device, such as a keypad, a touch screen, etc., and at least one output device, such as a display device, a speaker, etc. The power supply 760 may supply the mobile system 700 with power. In at least one exemplary embodiment of the inventive concept, the mobile system 700 may further include a camera image processor (CIS), and a modem, such as a baseband chipset. For example, the modem may be a modem processor that supports at least one of various communications, such as Global System For Mobile Communications (GSM), Global Packet Radio Service (GPRS), Wideband Code Division Multiple Access (WCDMA), High Speed Xlink Packet Access (HSxPA), etc.

In at least one exemplary embodiment of the inventive concept, the mobile system 700 and/or components of the mobile system 700 are packaged in various forms, such as a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline IC (SOIC), a shrink small outline package (SSOP), a thin small outline package (TSOP), a system in package (SIP), a multi chip package (MCP), a wafer-level fabricated package (WFP), or a wafer-level processed stack package (WSP).

Figure 8:
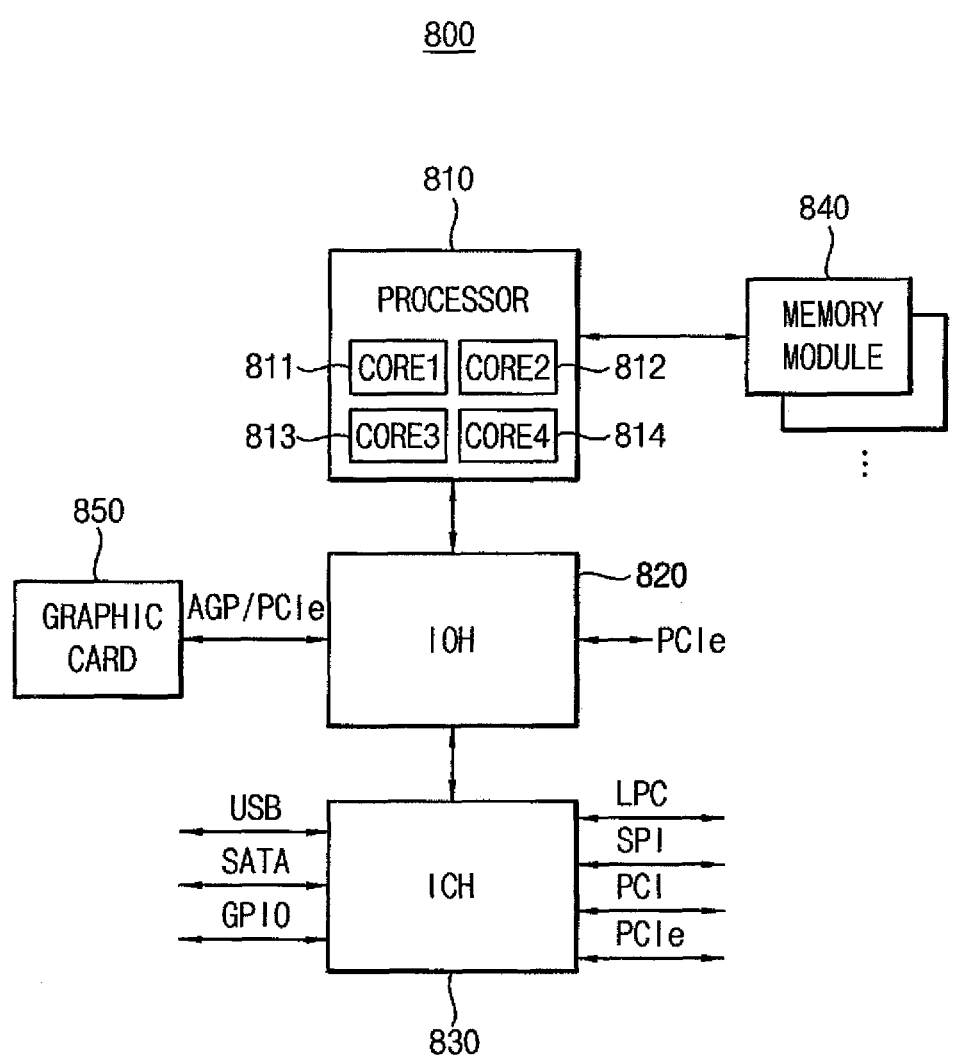
FIG. 8 is a block diagram illustrating a computing system according to an exemplary embodiment of the inventive concept.

FIG. 8 is a block diagram illustrating a computing system according to an exemplary embodiment of the inventive concept.

Referring to FIG. 8, a computing system 800 includes a processor 810, an input/output hub 820, an input/output controller hub 830, at least one memory module 840 and a graphic card 850. In at least one exemplary embodiment of the inventive concept, the computing system 800 may be any computing system, such as a personal computer (PC), a server computer, a workstation, a tablet computer, a laptop computer, a mobile phone, a smart phone, a personal digital assistant (PDA), a portable multimedia player (PMP), a digital camera, a digital television, a set-top box, a music player, a portable game console, a navigation device, etc.

The processor 810 may perform specific calculations or tasks. For example, the processor 810 may be a microprocessor, a central process unit (CPU), a digital signal processor, etc. The processor 810 may include processor cores 811, 812, 813, and 814. The processor cores 811-814 may execute applications, and the applications may request input/output operations for hardware devices, such as the memory module 840, the graphic card 850, or other devices coupled to the input/output hub 820 or the input/output controller hub 830. The processor 810 may perform load balancing by simultaneously comparing loads of the processor cores 811-814 to migrate a task from one processor core having a maximum load to another processor core having a minimum load. Accordingly, the processor cores 811-814 may efficiently operate, and a performance of the computing system 800 may be improved. In at least one exemplary embodiment of the inventive concept, the processor cores 811-814 are coupled to an internal or external cache memory. Although FIG. 8 illustrates an example of the computing system 800 including one processor 810, the computing system 800 may include one or more processors in other embodiments.

The processor 810 may include a memory controller that controls an operation of the memory module 840. The memory controller included in the processor 810 may be referred to as an integrated memory controller (IMC). A memory interface between the memory module 840 and the memory controller may be implemented by one channel including a plurality of signal lines, or by a plurality of channels. Each channel may be coupled to at least one memory module 840. In at least one exemplary embodiment of the inventive concept, the memory controller is included in the input/output hub 820. The input/output hub 820 including the memory controller may be referred to as a memory controller hub (MCH).

The input/output hub 820 may manage data transfer between the processor 810 and devices, such as the graphic card 850. The input/output hub 820 may be coupled to the processor 810 via one of various interfaces, such as a front side bus (FSB), a system bus, a HyperTransport, a lightning data transport (LDT), a QuickPath interconnect (QPI), a common system interface (CSI), etc. Although FIG. 8 illustrates an example of the computing system 800 including one input/output hub 820, the computing system 800 may include a plurality of input/output hubs in other embodiments.

The input/output hub 820 may provide various interfaces with the devices. For example, the input/output hub 820 may provide an accelerated graphics port (AGP) interface, a peripheral component interface-express (PCIe), a communications streaming architecture (CSA) interface, etc.

The graphic card 850 may be coupled to the input/output hub 820 via the AGP or the PCIe. The graphic card 850 may control a display device for displaying an image. The graphic card 850 may include an internal processor and an internal memory to process the image. In at least one exemplary embodiment of the inventive concept, the input/output hub 820 includes an internal graphic device along with or instead of the graphic card 850. The internal graphic device may be referred to as an integrated graphics, and an input/output hub including the memory controller and the internal graphic device may be referred to as a graphics and memory controller hub (GMCH).

The input/output controller hub 830 may perform data buffering and interface arbitration to efficiently operate various system interfaces. The input/output controller hub 830 may be coupled to the input/output hub 820 via an internal bus. For example, the input/output controller hub 830 may be coupled to the input/output hub 820 via one of various interfaces, such as a direct media interface (DMI), a hub interface, an enterprise Southbridge interface (ESI), PCIe, etc. The input/output controller hub 830 may provide various interfaces with peripheral devices. For example, the input/output controller hub 830 may provide a universal serial bus (USB) port, a serial advanced technology attachment (SATA) port, a general purpose input/output (GPIO), a low pin count (LPC) bus, a serial peripheral interface (SPI), a PCI, a PCIe, etc.

In at least one exemplary embodiment of the inventive concept, the processor 810, the input/output hub 820 and the input/output controller hub 830 are implemented as separate chipsets or separate integrated circuits. In at least one exemplary embodiment of the inventive concept, at least two of the processor 810, the input/output hub 820 and the input/output controller hub 830 are implemented as one chipset. A chipset including the input/output hub 820 and the input/output controller hub 830 may be referred to as a controller chipset, and a chipset including the processor 810, the input/output hub 820 and the input/output controller hub 830 may be referred to as a processor chipset.

As described above, according to at least one exemplary embodiment of the inventive concept, load balancing in a multi-core system including at least three cores may be performed by simultaneously comparing loads of the cores to migrate one task from one core having a maximum load to another core having a minimum load. Accordingly time and power consumption required for load balancing may be reduced. At least one exemplary embodiment of the inventive concept may be adaptively applied to multi-core systems including cores which employ hot-plugging. For example, in a system that employs hot-plugging, computer system components may be replaced without shutting down the system. However, the inventive concept is not limited to systems that employ hot-plugging, as they may be applied to various multi-core systems.

The foregoing is illustrative of example embodiments and is not to be construed as limiting thereof. Although exemplary embodiments have been described, many modifications are possible in these exemplary embodiments without departing from the present inventive concept. Accordingly, all such modifications are intended to be included within the scope of the present inventive concept.

What is claimed is:

1. A method of balancing tasks in a multi-core system including at least three cores, each core associated with a cache and a run queue, and each cache associated with a cache request counter, the method comprising:
   receiving, by a comparator, at least three values in parallel from the cache request counters through at least three first input channels and at least three second input channels, wherein each value of the at least three values is a cache-requesting number per unit time to a cache of an associated one of the cores;
   comparing simultaneously, by the comparator, the at least three values received through the at least three first input channels of the comparator and the same three values received through the at least three second input channels of the comparator to detect a maximum value and a minimum value;
   determining a first core among the at least three cores having the maximum value as a source core and a second core among the at least three cores having the minimum value as a target core; and
   migrating tasks assigned to the source core from the run queue associated with the source core to the run queue associated with the target core.

2. The method of claim 1, wherein the at least three values corresponds to at least three load weights of at least three run queues, each included in each of the at least three cores.

3. The method of claim 2, wherein the at least three load weights are generated based on schedule classes and priorities of at least three loads associated with the at least three run queues.

4. A multi-core system for balancing tasks comprising:
   at least three cores, each core associated with a cache and a run queue, and each cache associated with a cache request counter;
   a load comparator configured to receive at least three values in parallel from the cache request counters through at least three first input channels and at least three second input channels, wherein each value of the at least three values is a cache-requesting number per unit time to a cache of an associated one of the cores,
   wherein the comparator is further configured to simultaneously compare the at least three values received through the at least three first input channels of the comparator and the same three values received through the at least three second input channels of the comparator to detect a maximum value and a minimum value; and
   a load migrator configured to determine a first core among the at least three cores having the maximum value as a source core and a second core among the at least three cores having the minimum value as a target core to migrate tasks assigned to the source core from the run queue associated with the source core to the run queue associated with the target core.

5. The multi-core system of claim 4, wherein the load comparator comprises:
   a maximum load detector configured to compare simultaneously at least three load weights of at least three run queues to detect the maximum value, each of the at least three run queues corresponding to each of the at least three cores; and
   a minimum load detector configured to compare simultaneously the at least three load weights of the at least three request run queues to detect the minimum value,
   wherein the at least three values are the three load weights.

6. The multi-core system of claim 5, wherein the at least three load weights are generated based on schedule classes and priorities of at least three loads associated with the at least three run queues.

7. A multi-core system comprising:
   first through third cores, each core associated with a program counter and a run queue;
   first through third updating counters associated with the program counters, where each updating counter counts an updating number of a program per unit time for the programming counter for a corresponding one of the cores during a same unit time to determine three values;
   a load comparator including three first input channels to receive the three values in parallel from the updating counters to determine a maximum value, three second input channels to receive the three values in parallel from the updating counters to determine a minimum value, wherein the load comparator is configured to simultaneously compare the three values to determine the maximum value and the minimum value; and
   a load migrator configured to designate one of the cores having the maximum value as a source core and a second one of the cores having the minimum value to migrate a task assigned to the source core from the run queue associated with the source core to the run queue associated with the target core.

8. The multi-core system of claim 7, wherein the load comparator includes a first comparator including the three first input channels and a second comparator including the second input channels.

9. The multi-core system of claim 7, wherein the load comparator includes a pair of output channels configured to output the minimum and maximum values in parallel to the load migrator.

10. The multi-core system of claim 9, wherein the load migrator includes a pair of input channels to receive the minimum and maximum values in parallel from the load comparator.

11. The multi-core system of claim 7, wherein the values are sampled by the system periodically according to the unit time.

12. The multi-core system of claim 11, wherein the update counters are reset after the sampled values are output to the load comparator.

\* \* \* \* \*